(12) United States Patent
Verhasselt et al.

(10) Patent No.: US 7,747,437 B2
(45) Date of Patent: Jun. 29, 2010

(54) N-BEST LIST RESCORING IN SPEECH RECOGNITION

(75) Inventors: Jan Verhasselt, Erpe-Mere (BE); Helmut Dercks, Simmerath (DE)

(73) Assignee: Nuance Communications, Inc., Burlington, MA (US)

(*) Notice: Subject to any disclaimer, the term of this patent is extended or adjusted under 35 U.S.C. 154(b) by 1023 days.

(21) Appl. No.: 11/305,825

(22) Filed: Dec. 16, 2005

(65) Prior Publication Data

US 2006/0190258 A1 Aug. 24, 2006

Related U.S. Application Data

(60) Provisional application No. 60/636,671, filed on Dec. 16, 2004.

(51) Int. Cl.
G10L 15/18 (2006.01)
G06F 17/27 (2006.01)
G06F 3/048 (2006.01)

(52) U.S. Cl. .................. 704/257; 704/9; 704/252; 715/767

(58) Field of Classification Search ............ 704/9, 704/257, 270
See application file for complete search history.

(56) References Cited

U.S. PATENT DOCUMENTS

| | | | | |
|---|---|---|---|---|
| 5,241,619 A * | 8/1993 | Schwartz et al. | ............ | 704/200 |
| 5,745,649 A * | 4/1998 | Lubensky | ............ | 704/232 |
| 2002/0133341 A1* | 9/2002 | Gillick et al. | ............ | 704/235 |
| 2002/0135618 A1* | 9/2002 | Maes et al. | ............ | 345/767 |
| 2002/0150295 A1* | 10/2002 | Kwok et al. | ............ | 382/186 |
| 2005/0187768 A1* | 8/2005 | Godden | ............ | 704/238 |
| 2006/0009974 A1* | 1/2006 | Junqua et al. | ............ | 704/257 |
| 2006/0190256 A1* | 8/2006 | Stephanick et al. | ............ | 704/252 |

OTHER PUBLICATIONS

Schwartz et al., 'New uses for the N-Best sentence hypotheses within the BYBLOS speech recognition system', 1992 IEEE International Conference on Acoustics, Speech, and Signal Processing, 1992. ICASSP-92., vol. 1, pp. 1-4.*
Pellom et al., 'University of Colorado Dialog Systems for Travel and Navigation', Proceedings of the first international conference on Human language technology research, San Diego, 2001, pp. 1-6.*
Wai et al. "A Dynamic Semantic Model for Re-scoring Recognition Hypotheses", 2001 IEEE International Conference on Acoustics, Speech, and Signal Processing, 2001. Proceedings. (ICASSP '01)., published Aug. 7, 2002, vol. 1, 589-592.*
Stolcke, Andreas, 'SRILM An Extensible Language Modeling Toolkit' (2002).*
Wang et al., 'Rescoring effectiveness of language models using different levels of knowledge and their integration', IEEE International Conference on Acoustics, Speech, and Signal Processing, 2002. Proceedings. (ICASSP '02)., vol. 1, pp. I-785-I-788.*

\* cited by examiner

*Primary Examiner*—David R Hudspeth
*Assistant Examiner*—Justin W Rider
(74) *Attorney, Agent, or Firm*—Sunstein Kann Murphy & Timbers LLP

(57) ABSTRACT

A method of speech recognition processing is described based on an N-best list of recognition hypotheses corresponding to a spoken input. Each hypothesis on the N-best list is rescored based on its rank in the rescored N-best list. The rescoring may be based on a Statistical Language Model (SLM) or Dynamic Semantic Model (DSM). One or more rescoring categories may be associated with each recognition hypotheses to affect or bias the rescoring.

30 Claims, 2 Drawing Sheets

N-BEST LIST RESCORING IN SPEECH RECOGNITION

This application claims priority from U.S. provisional patent application 60/636,671, filed Dec. 16, 2004, the contents of which are incorporated herein by reference.

FIELD OF THE INVENTION

The invention relates to automatic speech recognition and specifically to rescoring of recognition hypotheses.

BACKGROUND ART

Operation of a typical speech recognition engine according to the prior art is illustrated in FIG. 1. A speech signal 10 is directed to a pre-processor 11, where relevant parameters are extracted. A pattern matching recognizer 12 tries to find the best word sequence recognition result 15 based on acoustic models 13 and a language model 14. The language model 14 describes words and how they connect to form a sentence. It might be as simple as a list of words in the case of an isolated word recognizer, or a context-free grammar, or as complicated as a statistical language model for large vocabulary continuous speech recognition. The acoustic models 13 establish a link between the speech parameters from the pre-processor 11 and the recognition symbols that need to be recognized. Further information on the design of a speech recognition system is provided, for example, in Rabiner and Juang, *Fundamentals of Speech Recognition* (hereinafter "Rabiner and Juang"), Prentice Hall 1993, which is hereby incorporated herein by reference.

More formally, speech recognition systems typically operate by determining a word sequence, Ŵ that maximizes the following equation:

$$\hat{W} = \arg\max_{W} P(W)P(A|W)$$

where A is the input acoustic signal, W is a given word string, P(W) is the probability that the word sequence W will be uttered, and P(A|W) is the probability of the acoustic signal A being observed when the word string W is uttered. The acoustic model characterizes P(A|W), and the language model characterizes P(W).

Rather than a single best recognition result, speech recognition applications may also give feedback to users by displaying or prompting a sorted list of some number of the best matching recognition hypotheses, referred to as an N-best list. This can be done for recognition of a spoken utterance as one or more words. This can also be done when the input is a spelled out sequence of letters forming one or more words, or a part of a word, in which case the best matching name may be identified by a spelling-matching module.

It is also known to rescore such N-best lists using additional information that was not available when the N-best list was initially constructed. Such extra information may come from various sources such as a statistical language model (SLM) that contains information about the a priori likelihood of the different recognition hypotheses. Even if the language model applied during the recognition is itself a statistical language model, the N-best list can still be rescored by means of another (typically more sophisticated) SLM. Rescoring of N-best lists based on a Statistical Language Model is described, for example, as a "Dynamic Semantic Model" in U.S. Pat. No. 6,519,562, which is incorporated herein by reference.

SUMMARY OF THE INVENTION

A representative embodiment of the present invention includes techniques for speech recognition processing of an N-best list of recognition hypotheses corresponding to a spoken input. The N-best list is rescored such that for each rescored hypothesis the rescoring depends on the rank of the rescored hypothesis in the rescored N-best list. The rescoring may be based, for example, on using a Statistical Language Model (SLM) or a Dynamic Semantic Model (DSM).

In further embodiments, the rescoring may include applying a bias to each rescored hypothesis depending on its rank in the rescored N-best list. Each allowable recognition hypothesis may be associated with at least one rescoring category in which case the rescoring may further depend on the rescoring category associated with each rescored hypothesis, such as applying a bias to each rescored hypothesis based on its rescoring category and rank in the rescored N-best list.

Selected positions in the N-best list may be reserved for recognition hypotheses of one or more selected rescoring categories, in which case, producing an N-best list may initially consider only hypotheses in the one or more selected rescoring categories. The rescoring categories may include categories for most recently used recognition hypotheses, most frequently used recognition hypotheses, and/or names within a geographic vicinity of one or more most frequently used names.

An embodiment may further provide a first output of the rescored hypotheses in a selected number of the top positions in the rescored N-best list. Then in response to a user action, a second output of the remaining rescored hypotheses may be provided.

In an embodiment, the rescoring may include dividing the rescored N-best list into blocks, where each block corresponds to a range of ranks in the rescored N-best list. The block boundaries then may vary depending on a metric corresponding to an expected recognition accuracy for the spoken input. For example, the metric may be based on a signal-to-noise ratio.

In some embodiments, the allowable recognition hypotheses represent place names for a navigation system such as city names and/or street names.

Embodiments of the present invention also include a device adapted to use any of the foregoing methods. For example, the device may be a navigation system such as for an automobile.

DETAILED DESCRIPTION OF SPECIFIC EMBODIMENTS

Figure 1:
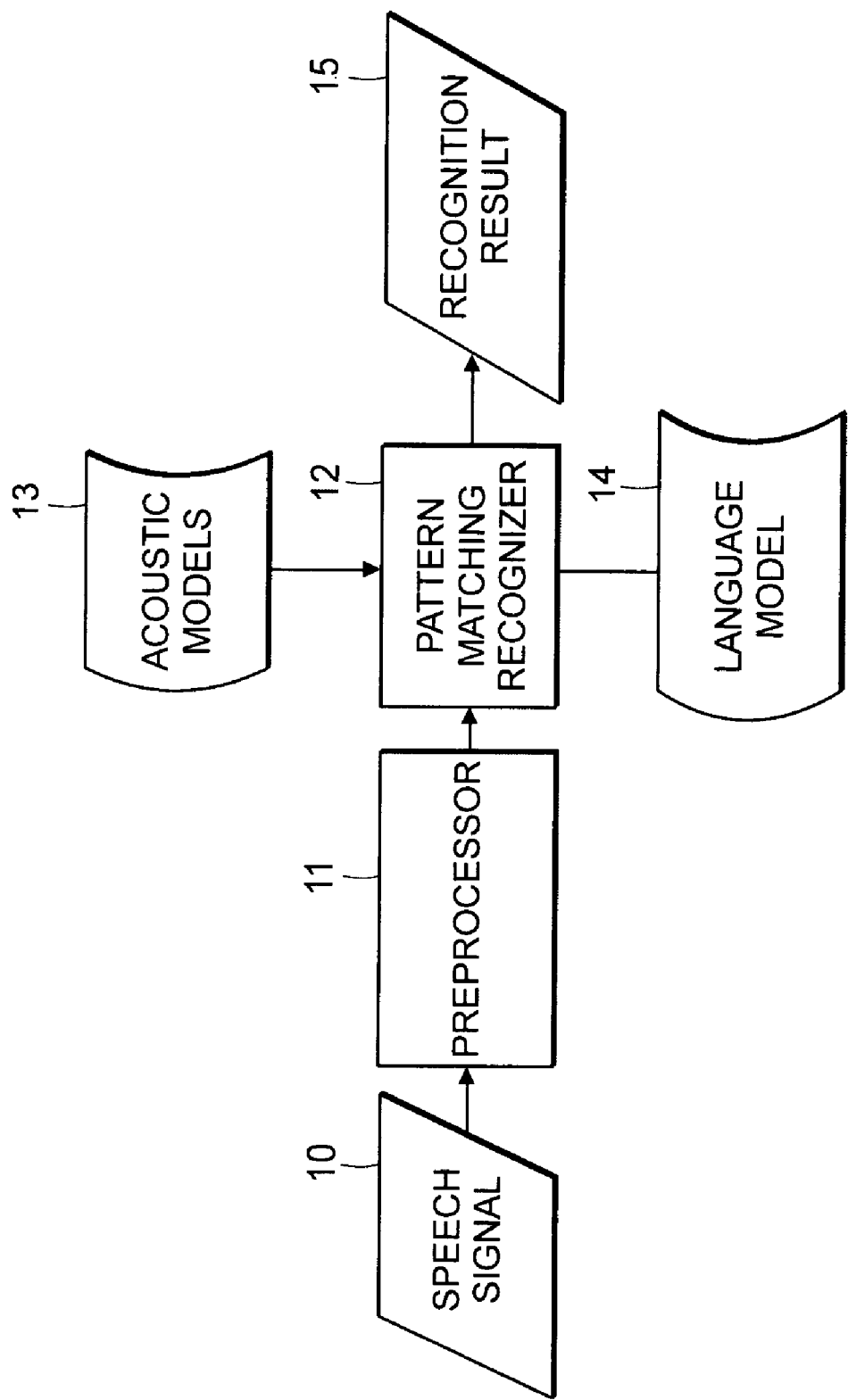
FIG. 1 shows a typical speech recognition engine according to the prior art.
Figure 2:
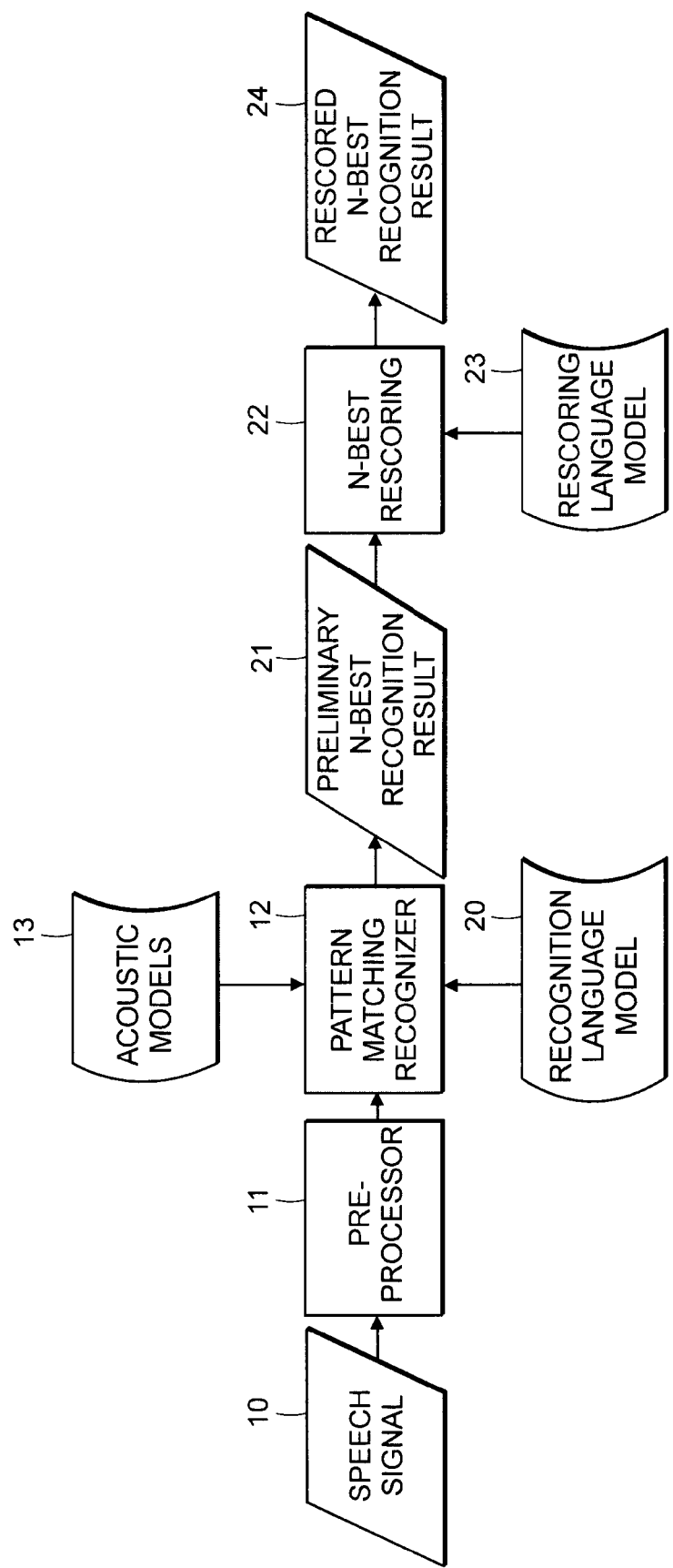
FIG. 2 shows a speech recognition engine according to an embodiment of the present invention.

Various embodiments of the present invention are directed to techniques for rescoring of spell-matching and speech recognition hypotheses in automatic speech recognition using biasing or weighting that depends on the ranking of the hypotheses in a rescored N-best list. Embodiments of the present invention can be used in both embedded and network ASR projects, including, but not limited to, directory assistance, destination entry and name dialing. This rescoring approach provides a good compromise between boosting the likelihood of the most important recognition hypotheses with respect to the others, and also making sure that the less important hypotheses can still be recognized. Long latencies and loading times of the ASR technology can be hidden in a way that is transparent to the user.

In one specific embodiment, the list of recognizable sentences is split into two or more categories. Then, a Statistical Language Model (SLM) can be as simple as a bias or weight to the recognized hypotheses depending on the category to which each hypothesis belongs and/or depending on the rank of the hypothesis in the rescored N-best list. In such an embodiment, a given number of the top positions in the rescored N-best list, "X," are reserved for recognition hypotheses of certain categories. That is, for some top number of positions in the N-best list an infinite penalty (infinite negative bias) is given to the recognizable sentences of all but certain hypothesis categories.

One specific application of such techniques is to address the problem of destination entry for a car navigation system. In such an application, the N-Best list provides place names such as city names and/or street names. A list of city names can be relatively long, for example, 70,000 names. The resulting long list can be split into three categories: (1) recently used names, (2) most frequently used names, and (3) the less frequently used names. Note that category (1) can contain names from both category (2) and category (3). A given name can belong to both category (1) and category (2). Another name can belong to both category (1) and category (3). A name may be considered "recently used" only if it was really used by the system so that recognition errors are not included, and it doesn't matter whether the name was entered by voice (word or spelling) or by a touch screen or other tactile interface. The split in "frequently used" and "less frequently used" names, may be pre-determined based on the population of the city and an indication of the tourist-relevancy of the city.

All the place names, for example, all city names of a country, can be precompiled into one ASR context including all phonetic transcription variants for those names. In such case, the recognition engine considers all hypotheses at the same time and produces an N-best list of most likely hypotheses. Subsequently a new N-best list is created by rescoring these hypotheses with a bias that depends on the rank in the rescored N-best list and on the rescoring category of the hypothesized name. For example, the first hypothesis in the rescored N-best list could be reserved for the names from the recently used and frequently used categories. Since the applied bias depends on the usage history (because it depends on whether the name has been recently used or not), this method can be viewed as an embodiment of a Dynamic Semantic Model (DSM) that depends on the rank of each hypothesis in the rescored N-best list.

In some further specific embodiments, the system's first response to a speaker's utterance may be to initially display or otherwise communicate to the user some given number, "Y," of the top positions in the rescored N-best list. If Y<X, then the remaining N–Y positions in the rescored N-best list need only be shown or otherwise communicated to the speaker after a specific request to learn about the next items. This request can be issued, for example, with a verbal command like "next screen," or by a tactile command like a push on a next screen button, or also silently by not taking any action for more than a certain amount of time.

This split result outputting also allows the recognition process to be split into two parts. In the first part, the recognition engine may initially consider only a subset of the recognizable sentences, the subset including at least the recognition vocabulary from the hypothesis categories for which the top X positions in the rescored N-best list are reserved. During this first part of the recognition process, the speaker's utterance can be temporarily stored as digitized audio, a series of features, or some other intermediate representation used by the recognition engine to perform the search and score computation process. Also some intermediate scores may be stored in that intermediate representation. In the second part of the recognition process while the speaker is reviewing the first part results ("Y"), the remaining recognizable utterances that correspond to can be recognized in one or more search processing runs on the stored utterance.

In the specific application of destination entry for a car navigation system, such techniques can be used to split the large list of names into several ASR contexts such as one or more contexts with frequently used names (category (2)) and one or more contexts with less frequently used names (category (3)).

In the first part of the speech recognition process only the first two categories of names are searched and the resulting N-best list is shown on a display screen. In this way, the speech recognition engine can continue performing recognition on the remaining names in the third category while the speaker already sees the first screen with the top Y results. After the search process for the remaining names has finished, the system merges the N-best list from the different searches and shows them if requested on the remaining screens. This improves the response time (as perceived by the user) at a given computation power, and the peak RAM requirements can be limited by not loading all names at the same time on the recognition engine.

In some embodiments, the feature stream produced by the preprocessor can be split into multiple parallel streams such that several recognition engines can run in parallel. The recognition context(s) with the names of category (2) can be loaded on one ASR engine instance, and the commands that need to be active at the same time and the names of category (1) can be loaded on one or more parallel engine instances. The N-best results of each of the engine instances are considered, and if the best hypothesis was not a command, the names hypotheses are post-processed by a Dynamic Semantic Model (DSM) as explained herein. The names of category (3) can be loaded on one or more other engine instances, some of which may run in parallel and/or after other engine instances have finished processing.

The distinction between categories (2) and (3) can be marked by setting one or more bits in a user ID that is associated to a name when compiling the context(s). Alternatively, the information can be put in a separate data-structure. This can be prepared in advance (e.g., at grammar compilation time), especially for the long item lists with more than some threshold number (e.g., 15,000) names. If the category is put in a different data structure, this preferably should be quickly accessible at run-time.

The N-best list(s) of the one or more recognition engines can be processed as follows. If the top-1 command hypothesis has a better sentence level score than the top-1 name hypothesis, the result of the name engine is ignored. This avoids re-ranking the N-best list when not needed. (In some embodiments certain commands may get a non-zero bias with respect to the names of certain categories when doing this comparison to determine whether a name or command was recognized). Otherwise, the recognition hypotheses of the name engine(s) are re-ranked based on their sentence level score, corrected with a penalty that depends on the category: most recently used names get no penalty, most frequently used names that are not in the most recently used list get a small penalty, and the remaining names that are not in the most recently used list get a larger penalty. The actual penalties, moreover, depend on the rank in the rescored N-best list. For some positions in the rescored N-best list, certain categories (typically the less frequently use names that are not in the recently used list) will get an infinite penalty. For other positions (typically deeper in the N-best list), all names may get the same penalty. One way of processing the results is from the top of the rescored N-best list down, while making sure that the same name is not included twice in the rescored N-best list.

In another exemplary embodiment, the recognition of the street names in the largest cities can be handled in the same way. However, it may not be possible to identify in advance the most frequently used streets in an acceptable way. In that case, distinction may only be made between the most recently used streets in a city and those that have not been used so far. This may be done only for the cities with more than 10,000 streets, in which case, only a limited number of cities may need that the lists of recently used streets be kept.

Other categories may be implemented in various specific embodiments. For example, in addition to the three categories—recently used, frequently used, and less frequently used—there may be a fourth category that corresponds to names in the neighborhood of most of the recently used names. Specifically, a geographic region such as a country is divided into sub-region tiles. For each recently used name, a look-up determines the corresponding sub-region tile. The most recently used sub-region tiles are determined based on the number of times a name from the tile has been recently used. Names in the most recently used tile or tiles, and possibly a subset of the surrounding tiles are assigned to a fourth category. Then the names in this fourth category are also positively biased in rescoring of the N-best list as described above.

In some embodiments, the re-scored N-best list is divided in two or more blocks, and within a block (so for a certain range of ranks in the re-scored list) a given specific rescoring method is used, as described above. But further, the boundaries of those blocks may vary in the application from one utterance to another. For example, the block boundaries may depend on a metric that is an indication of the expected recognition accuracy (or confidence score) on that utterance for the recognition task at hand. The signal-to-noise ratio (SNR) as measured on the utterance for which the result is re-scored may be used for this purpose. In addition or alternatively, the application may give a very negative bias to the less frequently used or less important names in the top X positions of the re-scored N-best list. Then if the SNR is high, X is smaller than if the SNR is low.

Embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of speech recognition processing comprising:
in an automatic speech recognition engine:
producing with a pattern matching recognizer an N-best list of recognition hypotheses corresponding to a spoken input; and
rescoring the hypotheses in the automatic speech recognition engine to produce a rescored N-best list output from the automatic speech recognition engine;
wherein the rescoring uses a plurality of rescoring categories based on position in the rescored N-best list such that some positions in the rescored N-best list are rescored based on a first combination of rescoring categories and other positions in the rescored N-best list are rescored based on a second combination of rescoring categories.

2. A method according to claim 1, wherein the rescoring is based on using a Statistical Language Model (SLM).

3. A method according to claim 1, wherein the rescoring is based on using a Dynamic Semantic Model (DSM).

4. A method according to claim 1, wherein the rescoring includes applying a bias to each rescored hypothesis depending on its rank in the rescored N-best list.

5. A method according to claim 1, wherein the at least one rescoring category includes a category for most recently used recognition hypotheses.

6. A method according to claim 1, wherein the at least one rescoring category includes a category for most frequently used recognition hypotheses.

7. A method according to claim 6, wherein the at least one rescoring category includes a category for names within a geographic vicinity of one or more most frequently used names.

8. A method according to claim 1, in which selected positions in the N-best list are reserved for recognition hypotheses of one or more selected rescoring categories.

9. A method according to claim 8, wherein producing an N-best list initially considers only hypotheses in the one or more selected rescoring categories.

10. A method according to claim 1, further comprising:
providing a first output of the rescored hypotheses in a selected number of the top positions in the rescored N-best list; and
in response to a user action, providing a second output of the remaining rescored hypotheses.

11. A method according to claim 1, wherein the recognition hypotheses represent place names for a navigation system.

12. A method according to claim 11, wherein the place names are city names.

13. A method according to claim 11, wherein the place names are street names.

14. A method according to claim 1, wherein the rescoring includes:
dividing the rescored N-best list into blocks, each block corresponding to a range of ranks in the rescored N-best list, the block boundaries varying depending on a metric corresponding to an expected recognition accuracy for the spoken input.

15. A method according to claim 14, wherein the metric is based on a signal-to-noise ratio.

16. A speech recognition processing arrangement comprising:
an automatic speech recognition engine having:
means for producing an N-best list of recognition hypotheses corresponding to a spoken input; and
means for rescoring the hypotheses to produce a rescored N-best list output;
wherein the rescoring uses a plurality of rescoring categories based on position in the rescored N-best list such that some positions in the rescored N-best list are rescored based on a first combination of rescoring categories and other positions in the rescored N-best list are rescored based on a second combination of rescoring categories.

17. A speech processing arrangement according to claim 16, wherein the means for rescoring is based on using Statistical Language Model (SLM) means.

18. A speech processing arrangement according to claim 16, wherein the means for rescoring is based on using Dynamic Semantic Model (DSM) means.

19. A speech processing arrangement according to claim 16, wherein the means for rescoring includes applying a bias to each rescored hypothesis depending on its rank in the rescored N-best list.

20. A speech processing arrangement according to claim 16, wherein the at least one rescoring category includes a category for most recently used recognition hypotheses.

21. A speech processing arrangement according to claim 16, wherein the at least one rescoring category includes a category for most frequently used recognition hypotheses.

22. A speech processing arrangement according to claim 21, wherein the at least one rescoring category includes a category for names within a geographic vicinity of one or more most frequently used names.

23. A speech processing arrangement according to claim 16, in which selected positions in the N-best list are reserved for recognition hypotheses of one or more selected rescoring categories.

24. A speech processing arrangement according to claim 23, wherein the means for producing an N-best list initially considers only hypotheses in the one or more selected rescoring categories.

25. A speech processing arrangement according to claim 16, further comprising:
means for providing a first output of the rescored hypotheses in a selected number of the top positions in the rescored N-best list; and
means for providing, in response to a user action, a second output of the remaining rescored hypotheses.

26. A speech processing arrangement according to claim 16, wherein the recognition hypotheses represent place names for a navigation system.

27. A speech processing arrangement according to claim 26, wherein the place names are city names.

28. A speech processing arrangement according to claim 26, wherein the place names are street names.

29. A speech processing arrangement according to claim 16, wherein the means for rescoring includes means for dividing the rescored N-best list into blocks, each block corresponding to a range of ranks in the rescored N-best list, the block boundaries varying depending on a metric corresponding to an expected recognition accuracy for the spoken input.

30. A speech processing arrangement according to claim 29, wherein the metric is based on a signal-to-noise ratio.

* * * * *